(12) United States Patent
Arnold et al.

(10) Patent No.: US 11,792,673 B2
(45) Date of Patent: Oct. 17, 2023

(54) METHOD, DEVICE, AND SYSTEM FOR DATA ANALYTICS REPORTING

(71) Applicant: Deutsche Telekom AG, Bonn (DE)

(72) Inventors: Paul Arnold, Frankfurt/M (DE); Gerd Zimmermann, Weiterstadt (DE); Michael Einhaus, Leipzig (DE)

(73) Assignee: DEUTSCHE TELEKOM AG, Bonn (DE)

( * ) Notice: Subject to any disclaimer, the term of this patent is extended or adjusted under 35 U.S.C. 154(b) by 23 days.

(21) Appl. No.: 17/773,054

(22) PCT Filed: Oct. 29, 2020

(86) PCT No.: PCT/EP2020/080409
§ 371 (c)(1),
(2) Date: Apr. 29, 2022

(87) PCT Pub. No.: WO2021/084015
PCT Pub. Date: May 6, 2021

(65) Prior Publication Data
US 2023/0129773 A1 Apr. 27, 2023

(30) Foreign Application Priority Data
Oct. 31, 2019 (EP) .................................. 19206457

(51) Int. Cl.
*H04W 24/08* (2009.01)
*H04W 24/10* (2009.01)

(52) U.S. Cl.
CPC .......... *H04W 24/10* (2013.01); *H04W 24/08* (2013.01)

(58) Field of Classification Search
CPC . H04L 43/16; H04L 67/1008; H04L 41/0896; H04L 41/40; H04L 43/20;
(Continued)

(56) References Cited

U.S. PATENT DOCUMENTS 10,216,909 B2 * 2/2019 Hamilton, II .......... A61B 5/486
10,244,403 B2 * 3/2019 Bhattacharjee ....... H04W 16/18
(Continued)

FOREIGN PATENT DOCUMENTS

WO WO 2012152306 A1 11/2012
WO WO 2013015725 A1 1/2013

OTHER PUBLICATIONS

Einhaus Michael et al: "Processing Time Aware Resource Allocation in Software Defined RANs", 2019 IEEE Conference On Standards for Communications and Networking (CSCN), IEEE, Oct. 28, 2019 (Oct. 28, 2019), pp. 1-6, XP033673549, DOI: 10.1109/CSCN.2019.8931 314.
(Continued)

*Primary Examiner* — Syed Ali
(74) *Attorney, Agent, or Firm* — LEYDIG, VOIT & MAYER, LTD.

(57) ABSTRACT

Data analytics reporting (DAR) of a Radio Access Network (RAN) key performance indicator (KPI) from a data extraction entity (DEE) to a data analytics entity (DAE) in a data analytics process (DAP) is performed via an interface. The DEE is comprised in a gNB-Distributed Unit (gNB-DU) or a function therein. The DAE is comprised in a gNB-Centralized Unit (gNB-CU) or a function therein. A dataset regarding said KPI is transmitted from the DEE to the DAE. Said dataset comprises at least one empirical statistical moment $m_i$ determined by the DEE. Each of the at least one empirical statistical moment $m_i$ is determined by the DEE based on the following equation:

$$m_i = \frac{1}{N_S}\sum_{n=1}^{N_S} s_n^i.$$

(Continued)

$s_n$ is a data sample of the KPI, and $N_S$ is a number of samples contributing to the respective moment $m_i$.

12 Claims, 8 Drawing Sheets

(58) Field of Classification Search
CPC ..... H04L 43/08; H04L 41/22; G06F 9/50833; G06F 9/5038; G06F 9/5072; G06Q 30/0201
See application file for complete search history.

(56) References Cited

U.S. PATENT DOCUMENTS

| | | |
|---|---|---|
| 2005/0037786 A1 | 2/2005 | Edge |
| 2011/0151881 A1 | 6/2011 | Chou et al. |
| 2014/0120930 A1 | 5/2014 | Harris et al. |
| 2014/0194113 A1 | 7/2014 | Ahlström et al. |
| 2015/0131537 A1* | 5/2015 | Chiang ................ H04L 5/0057 370/329 |
| 2016/0241429 A1* | 8/2016 | Froehlich ............ H04L 41/0631 |
| 2018/0270676 A1* | 9/2018 | Guven ................ H04W 24/06 |
| 2019/0080246 A1* | 3/2019 | Sun .................... G06Q 30/0201 |
| 2020/0028746 A1* | 1/2020 | Zawadzki ........... H04L 43/0876 |

OTHER PUBLICATIONS

"3rd Generation Partnership Project; Technical Specification Group Services and System Aspects; Study of Enablers for Network Automation for 5G (Release 16)", 3GPP Standard; Technical Report; 3GPP TR 23.791, 3rd Generation Partnership Project (3GPP), Mobile Competence Centre; 650, Route Des Lucioles; F-06921 Sophta-Antipolis Cedex; France, vol. SA WG2, No. V16.2.0, Jun. 11, 2019 (Jun. 11, 2019), pp. 1-124, XP051753968, Whole Section 6.6.1.

Sallent O et al: "Data Analytics in the 5G Radio Access Network and Its Applicability to Fixed Wireless Access", 2019 IEEE 89th Vehicular Technology Conference (VTC2019-Spring), IEEE, Apr. 28, 2019 (Apr. 28, 2019), pp. 1-6, XP033568298, DOI: 10.1109/VTCSPRING.2019.8746553 Sections I to IV.

* cited by examiner

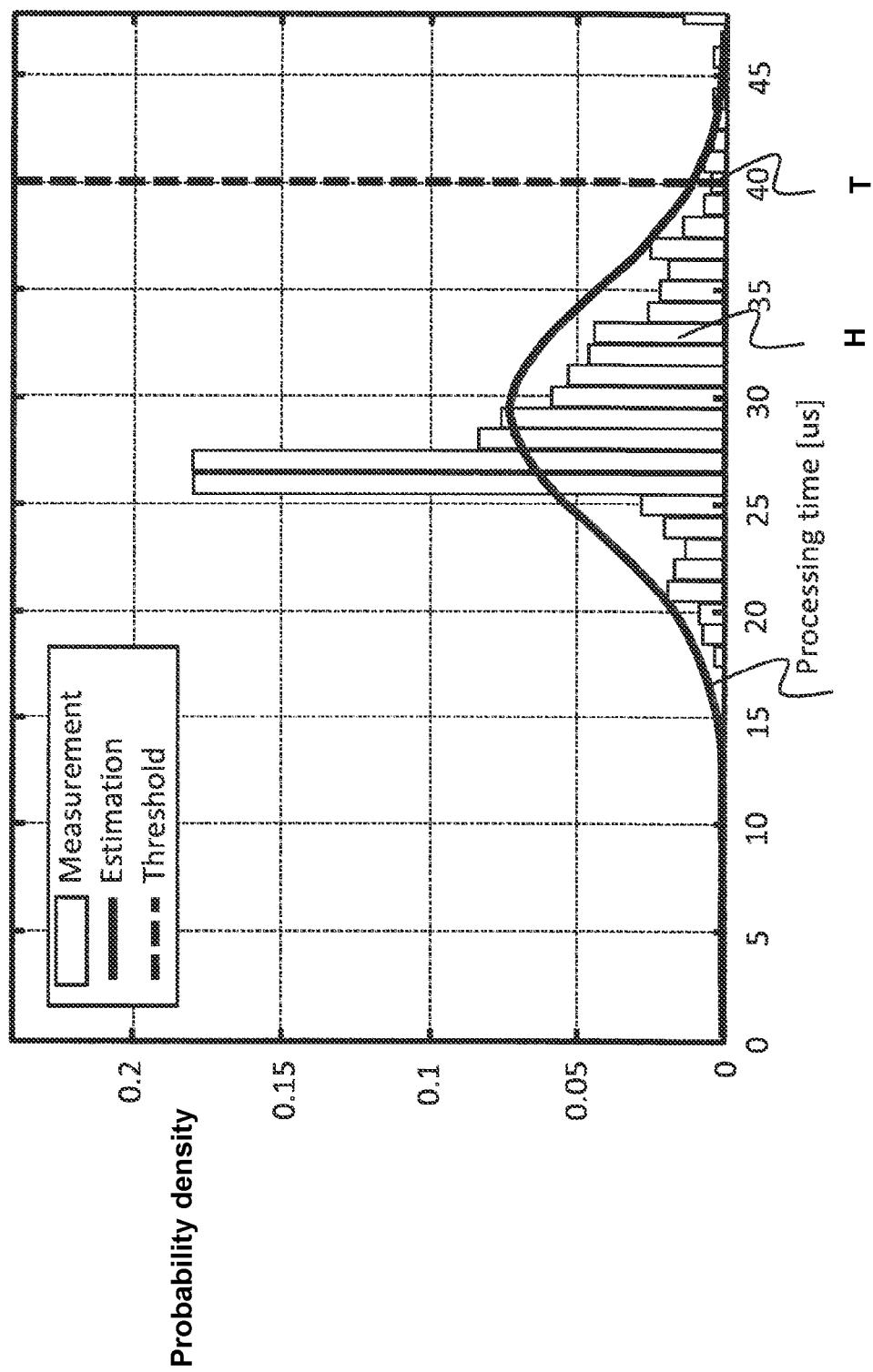

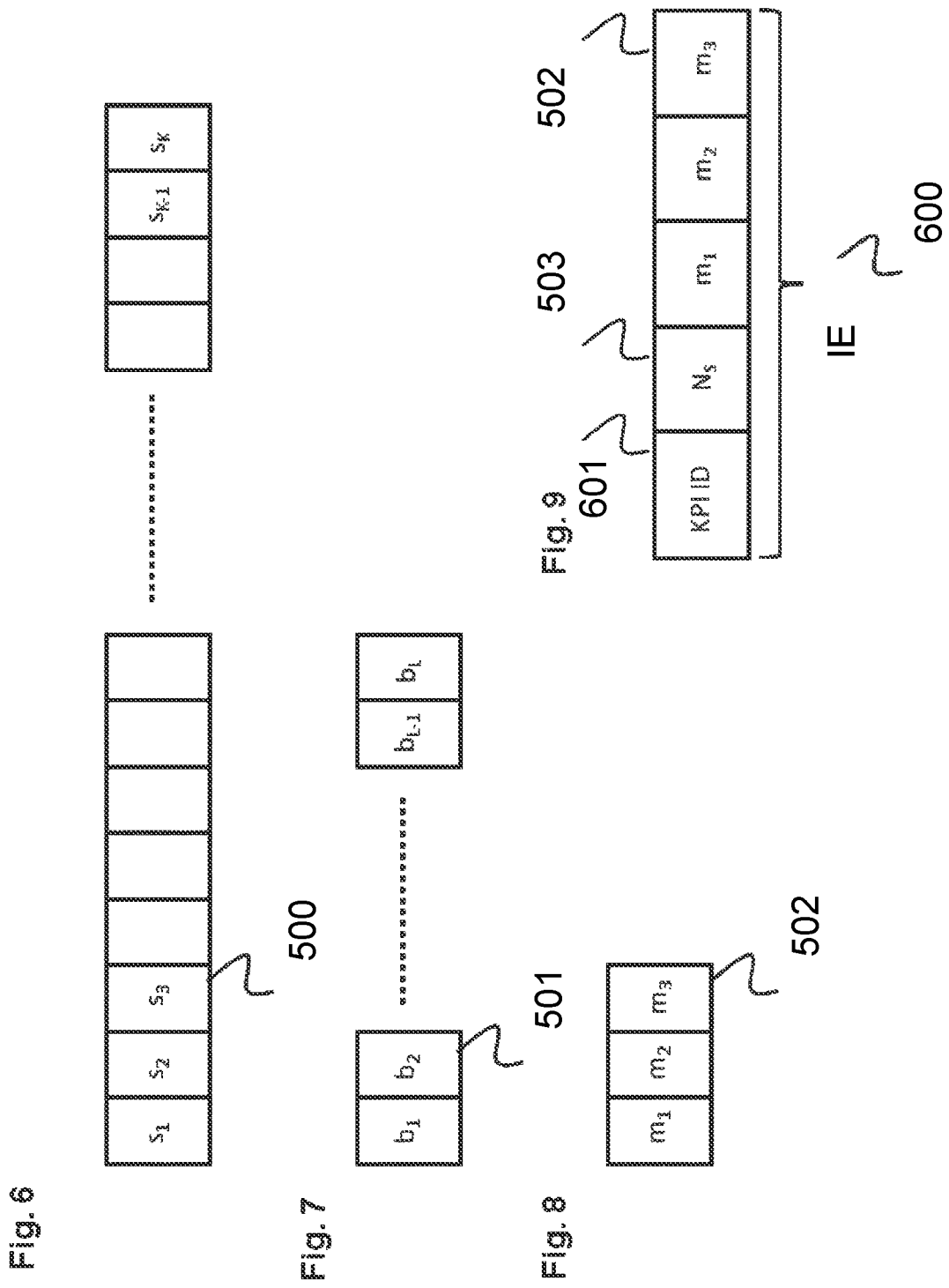

METHOD, DEVICE, AND SYSTEM FOR DATA ANALYTICS REPORTING

CROSS-REFERENCE TO PRIOR APPLICATIONS

This application is a U.S. National Phase application under 35 U.S.C. § 371 of International Application No. PCT/EP2020/080409, filed on Oct. 29, 2020, and claims benefit to European Patent Application No. EP 19206457.4, filed on Oct. 31, 2019. The International Application was published in English on May 6, 2021 as WO 2021/084015 A1 under PCT Article 21(2).

FIELD

The invention relates to a method, device, and system for data analytics reporting, including a method for data analytics reporting via an enhanced F1-, Xn-, or NG-Interface of a 3GPP RAN centric data analytics framework.

BACKGROUND

In a 5G system (5GS), the use of data analytics is an important feature to support the network automation processes with respect to deployment, management and operation. In the 5G-related NG-Radio Access Network (NG-RAN) part, a next generation NodeB (gNB) includes at least one centralized unit (CU) and one or more distributed units (DUs) interconnected via a standardized interface, preferably a F1 interface, as depicted in FIG. 1. The NG-RAN represents the newly defined radio access network for 5GS. NG-RAN provides both NR and LTE radio access.

An NG-RAN node, i.e. base station, is either: a gNB, i.e. a 5G base station, providing NR user plane and control plane services; or, an ng-eNB, providing LTE/E-UTRAN services towards the UE. The gNBs and/or ng-eNBs are interconnected with each other by means of the Xn interface. The gNBs and/or ng-eNBs are also connected by means of the NG interfaces to the 5G Core network (5GC).

The NG-RAN protocol stack might be deployed in a disaggregated manner between gNB-CU and gNB-DUs. In such a disaggregated architecture, collecting measurement and operational data from gNB-DUs belonging to the same logical gNB and UEs connected to radio cell layers established by those gNB-DUs is necessary.

This facilitates the employment of data analytics strategies that support RAN functionalities like radio link operations and radio resource management (RRM), network operations and maintenance (OAM), minimization of drive tests (MDT), and self-organizing networks (SON).

FIG. 1 shows an overall 5GS architecture with details for NG-RAN according to 3GPP TS 38.401 V15.6.0 (2019 July). The 5GC 100 communicates to the NG-RAN 200 via NG interfaces 101 and 102, in particular, with a first gNB 201a via a first interface 101 and with a second gNB 201b via a second interface 102. Furthermore, within the NG-RAN 200 the first gNB 201a communicates with the second gNB via an Xn interface 205. Said second gNB 201b comprises a gNB-CU 204 and two gNB-DUs 202a and 202b as detailed above. In said configuration the gNB-CU 204 communicates with the gNB-DUs via respective F1 interfaces 203.

Another approach for data analytics as considered, for example, in the Open RAN Alliance (O-RAN) is to define a new dedicated logical node in the RAN that takes care of data collection and analytics across one or more gNBs. The node is described as near-real time (RT) RAN Intelligent Controller (MC), and it is connected to the gNB-CU and/or gNB-DU via the E2 interface, as shown in FIG. 2. It is noted that neither MC nor E2 are specified within 3GPP.

FIG. 2 shows an overall O-RAN reference architecture according to O-RAN Alliance White Paper "Towards an Open and Smart RAN" (2018 October). The architecture comprises OAM 301, a MC 302 with an applications layer 303, a multi-RAT CU protocol stack 304, a NFVI platform 307, and RAN-DU 305, and a RAN RRU 306.

In conventional telecommunication networks, available parameter information with respect to data collection for RAN key performance indicators (KPIs) rely on long term average values, see e.g. 3GPP TS 28.552/554, which is not accurate enough for future analytics methods. Said future methods may comprise sophisticated artificial intelligence (AI), machine learning (ML), and automation processes, that may trigger also short-term reactions in the RAN infrastructure, e.g. handover, load balancing, etc.

SUMMARY

In an exemplary embodiment, the present invention provides a method for data analytics reporting (DAR) of a Radio Access Network (RAN) key performance indicator (KPI) from a data extraction entity (DEE) to a data analytics entity (DAE) in a data analytics process (DAP). The DEE is comprised in a gNB-Distributed Unit (gNB-DU) or a function therein. The DAE is comprised in a gNB-Centralized Unit (gNB-CU) or a function therein. The reporting is performed via an interface. A dataset regarding said KPI is transmitted from the DEE to the DAE. Said dataset comprises at least one empirical statistical moment $m_i$ determined by the DEE. Each of the at least one empirical statistical moment $m_i$ is determined by the DEE based on the following equation:

$$m_i = \frac{1}{N_S} \sum_{n=1}^{N_S} s_n^i.$$

$s_n$ is a data sample of the KPI and $N_S$ is a number of samples contributing to the respective moment $m_i$.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5 shows a diagram for a comparison between moment based estimation of a distribution in terms of bins and an empirical moments based estimation according to the invention;

FIG. 6 shows a dataset for reporting a sequence of K samples;

FIG. 7 shows a dataset for reporting a sequence of L bins of an empirical distribution;

FIG. 8 shows a dataset for reporting a sequence of the first three moments of the empirical distribution according to an embodiment of the invention;

FIG. 9 shows the reporting format for an information element according to an embodiment of the invention.

DETAILED DESCRIPTION

Figure 1:
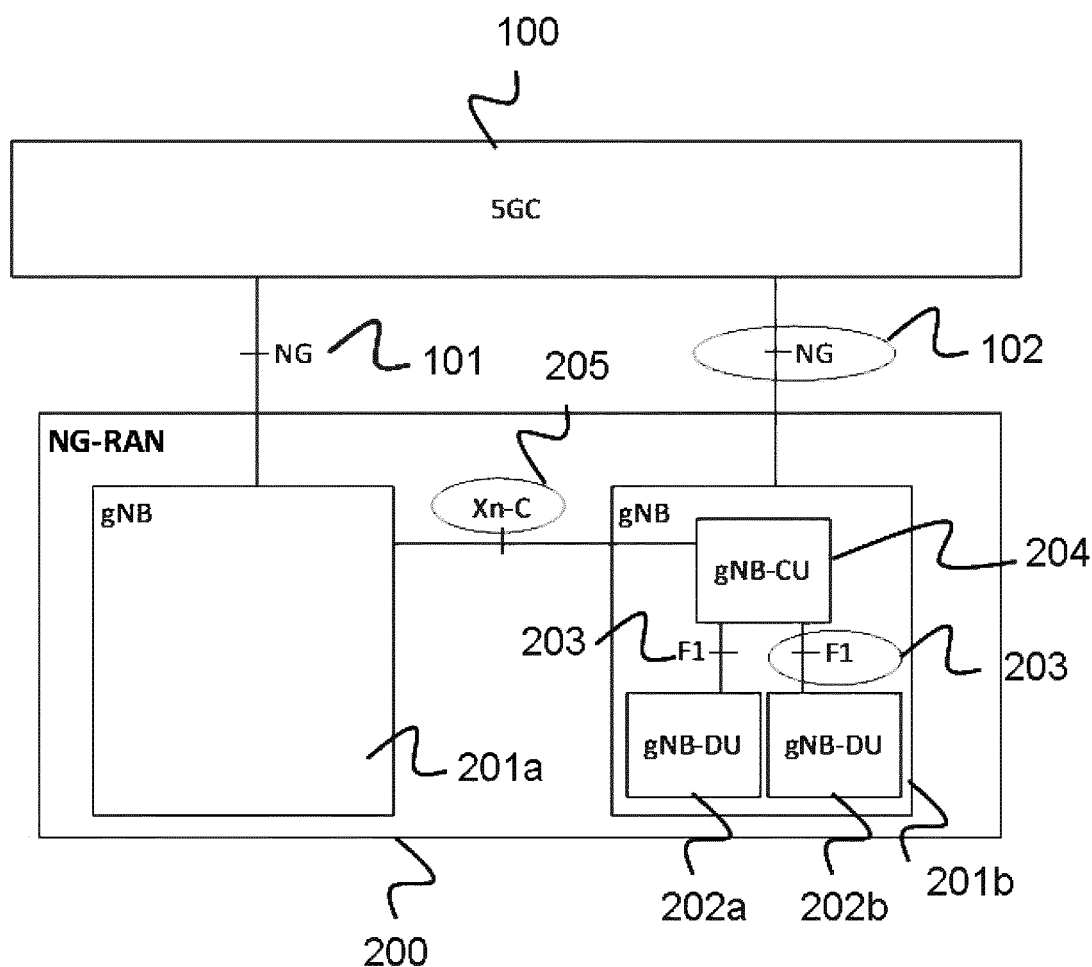
FIG. 1 shows an overall 5GS architecture with details for NG-RAN according to 3GPP TS 38.401 V15.6.0 (2019 July)
Figure 2:
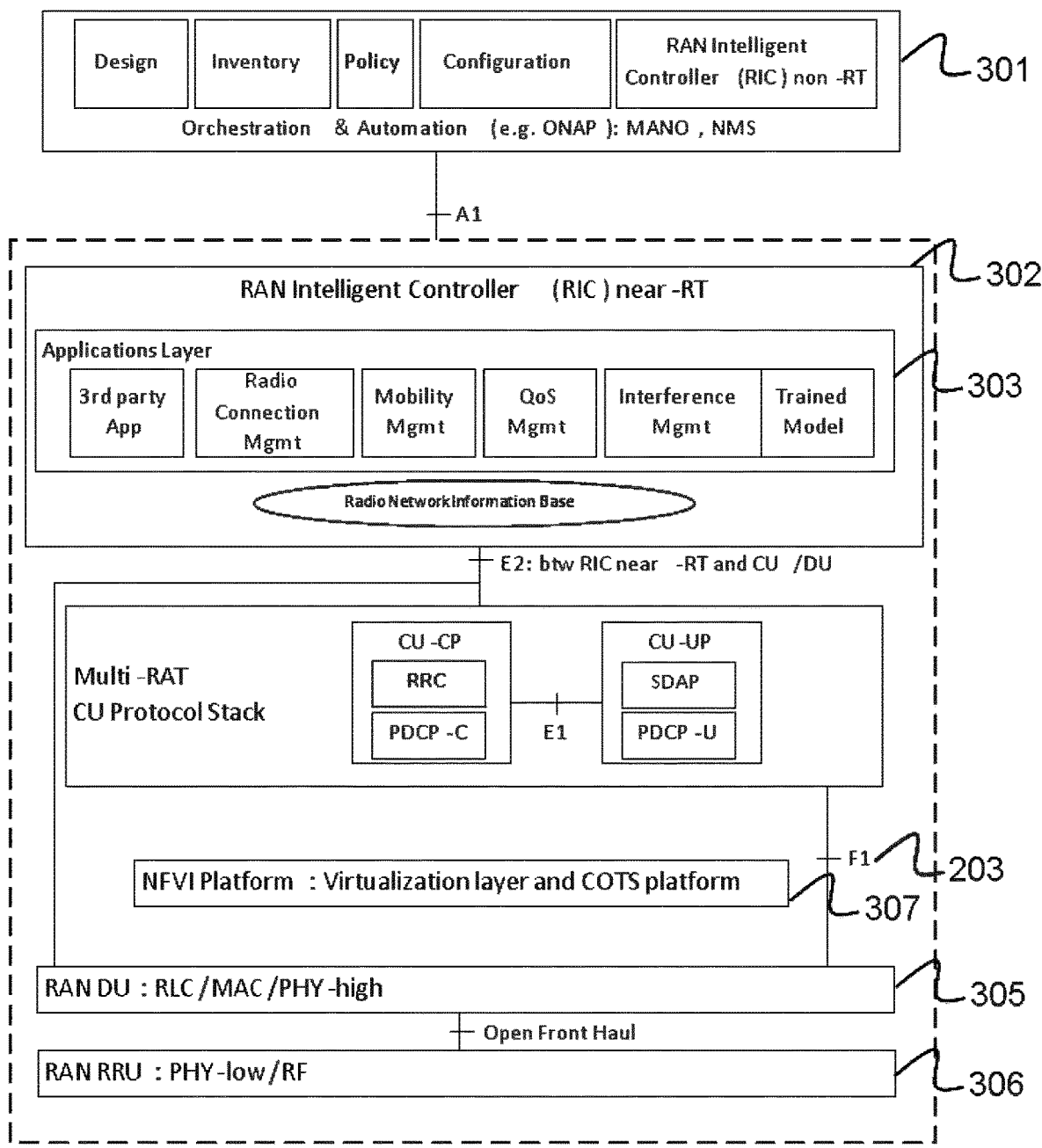
FIG. 2 shows an overall O-RAN reference architecture according to O-RAN Alliance White Paper "Towards an Open and Smart RAN" (2018 October)

Exemplary embodiments of the invention provide an improved method, device, and system for data analytics reporting.

According to the invention there is provided a method for data analytics reporting (DAR) via an extended standardized interface with respect to at least one RAN key performance indicator (KPI) from at least one data extraction entity (DEE) to at least one data analytics entity (DAE) in a data analytics process (DAP); wherein a dataset is transmitted from a respective DEE to a respective DAE, which comprises at least one, preferably two, three, or more, of empirical statistical moments determined by the DEE.

Hereinafter the term "at least one of empirical statistical moments" refers to any selection from the number of statistical moments of a distribution $m_1$, $m_2$, $m_3$, and so on. In preferred embodiments at least two of statistical moments are used. The selected statistical moments are not necessarily a selection of subsequent moments. According to a preferred embodiment $m_2$ is the "at least one" statistical moment.

In an aspect of the invention the method further comprises the steps of: at at least one DEE, of the DAP, determining at least one, preferably two, three, or more, empirical statistical moments for a number $N_S$ of samples $s_n$ measured at the DEE; transmitting a dataset from the DEE via the interface to at least one DAE of the DAP; and receiving said dataset at the at least one DAE; wherein the dataset comprises the empirical statistical moments, and wherein preferably the determining at least one, preferably two, three, or more, empirical statistical moments is based on a histogram distribution with respect to measured KPI data.

In an aspect of the invention the one, preferably two, three, or more, of empirical statistical moments, $m_i$, are determined based on the following equation:

$$m_i = \frac{1}{N_S}\sum_{n=1}^{N_S} s_n^i;$$

and wherein $s_n$ is a data sample and $N_S$ is a number of samples contributing to the respective moment $m_i$.

In an aspect of the invention the dataset further comprises the number of samples $N_S$.

In an aspect of the invention the extended standardized interface is one of an NG, F1, or Xn interface; and/or wherein the data exchange between DEE and DAE via said interface is implemented based on information elements, IEs.

In an aspect of the invention each IE is configured to be transmitted based on a periodic interval or on an aperiodic request send from the DAE to the DEE.

In an aspect of the invention each IE comprises a bit string which comprises information about a format of KPI specific values.

In an aspect of the invention the IE comprises at least one of the following: a KPI ID, the number of samples $N_S$, and the empirical statistical moments.

In an aspect of the invention the one or more DEEs correspond to one or more gNB-DUs or a function therein; and wherein the one or more DAE correspond to a gNB-CU or a function therein.

In an aspect of the invention a near-RT RIC is configured as DAE collecting data from several gNB-CUs and/or gNB-DUs.

In an aspect of the invention a 5GC function is configured as DAE receiving data from several gNB-DUs and/or gNB-CUs configured as DEEs.

In an aspect of the invention the one or more KPI relate to a parameter measured for at least one of:
i) per-slice,
ii) per-beam,
iii) per user,
iv) per QoS Class Identifier (QCI) class,
v) per gNB-DU, and/or
vi) per gNB-CU.

In an aspect of the invention, the set of KPIs that are monitored and associated with a corresponding KPI ID comprises at least one of the following:
a) UE throughput in downlink, DL, and uplink, UL, respectively;
b) Physical resource block (PRB) usage in downlink (DL) and uplink (UL), respectively;
c) Wideband and/or subband channel quality indicator (CQI);
d) Modulation and coding scheme (MCS) usage in downlink (DL) and uplink (UL), respectively;
e) PDCP end-to-end latency in downlink (DL) and uplink (UL), respectively;
f) HARQ ACK/NACK ratio in downlink (DL) and uplink (UL), respectively;
g) Spatial precoder usage in downlink (DL) and uplink (UL), respectively;
h) Spatial rank usage in downlink (DL) and uplink (UL), respectively;
i) Transport block size (TBS) usage in downlink (DL) and uplink (UL), respectively;
j) Number of scheduled UEs per time interval, subframe, and/or slot in downlink (DL) and uplink (UL), respectively;
k) Computational resource utilization of specific RAN-related virtualized network functions;
l) Composite available capacity (CAC);
m) Transport Network Layer (TNL) load or available capacity, respectively;
n) Hardware (HW) load; and
o) Number of UEs in Radio Resource Control (RRC) connected.

According to the invention, there is provided a mobile telecommunication network infrastructure device, preferably a gNB, configured as a data extraction entity (DEE) to transmit, via an extended standardized interface with respect to at least one RAN key performance indicator (KPI), a dataset, to at least one data analytics entity (DAE) in a data analytics process (DAP); wherein the dataset is transmitted from a respective DEE to a respective DAE, which comprises at least one, preferably two, three, or more, of empirical statistical moments determined by the DEE. In a preferred embodiment the device is configured for data analytics reporting according to the method of any one of the preceding aspects.

According to the invention there is provided a mobile telecommunication network infrastructure device, preferably a gNB or 5GC function, configured as a data analytics entity (DAE) to receive, via an extended standardized interface with respect to at least one RAN key performance indicator (KPI), a dataset, from least one data extraction entity (DEE) in a data analytics process (DAP); wherein the dataset is transmitted from a respective DEE to a respective DAE, which comprises at least one, preferably two, three, or more, of empirical statistical moments determined by the DEE. In a preferred embodiment the device is configured for data analytics reporting according to the method of any one of the preceding aspects.

According to the invention there is provided a system for data analytics reporting according to the method of any one of the preceding aspects, wherein the system comprises at least one data extraction entity (DEE) and at least one data analytics entity (DAE); wherein a dataset which is transmitted from a respective DEE to a respective DAE comprises at least one, preferably two, three, or more, of empirical statistical moments determined by the DEE.

According to the invention there is provided a computer program product comprising instructions which, when the program is executed by a mobile telecommunication network infrastructure, cause the network to carry out the method according to any one of the preceding aspects.

Since the RAN protocol stack might be deployed in a disaggregated manner between gNB-CU and gNB-DUs, in a disaggregated architecture, the functionality of a gNB-CU should be extended for collecting measurement and operational data from gNB-DUs belonging to the same logical gNB and UEs connected to radio cell layers established by those gNB-DUs.

This facilitates the employment of data analytics strategies that support RAN functionalities like radio link operations and radio resource management (RRM), network operations and maintenance (OAM), minimization of drive tests (MDT), and self-organizing networks (SON).

The gNB-CU may furthermore exchange those data and the outcome of analytics with other nodes of the 5GS, such as a) other gNBs via the Xn interface,
b) the 5GC via the NG interface, or
c) the OAM system.

Additional statistical values for RAN parameters, such as the standard deviation and variance, are reported based on extended standardized interfaces, such as F1, Xn or NG, to improve the output of any algorithm while keeping the additional overhead low.

To ensure interoperability among vendor specific network nodes, a RAN data analytics framework for parameter definition and statistical property reporting is defined.

The extraction of the statistical parameters during operation is kept as simple as possible, while still providing sufficient accuracy for the applied data analytics strategies and based thereon respective ML concepts.

Inadequate degrees of computational complexity are avoided during the data extraction, and any interruption or impairment of the steady and regular RAN operation is inhibited.

At the DAE, a statistical model is used to process the received dataset. In particular a probability distribution for a monitored KPI is derived. The selection of the statistical model is preferably based on the number of received statistical moments and/or further information comprised in the dataset.

In the following, embodiments of the invention will be described. It is noted that some aspects of every described embodiment may also be found in some other embodiments unless otherwise stated or obvious to the skilled person. However, for increased intelligibility, each aspect will only be described in detail when first mentioned and any repeated description of the same aspect will be omitted.

In an embodiment of the invention of a gNB-CU to gNB-DU split option, which is specified by 3GPP, a split within NR radio layer 2 between PDCP and RLC layer, also known as "higher layer split", HLS, as described in 3GPP TR 38.401 is used. This means that PHY, MAC and RLC layer are located in the gNB-DU while PDCP and SDAP plus RRC layer are located in the gNB-CU, the SDAP in the user plane, UP, and the RRC in the control plane, CP, protocol stack.

In said embodiment the F1 interface interconnects CU and DUs within a gNB with the corresponding F1 application protocol (FLAP) specified in 3GPP TS 38.473. The 5G NR, centralized radio resource coordination or load balancing can be performed in the gNB-CU in combination with related DUs, but could be also done across gNB boundaries based on information exchange by means of the Xn application protocol, XnAP, as described in 3GPP TS 38.423.

This requires an RRM functionality placed at a central entity which could be represented by either a master gNB or gNB-CU, or alternatively or additionally by the near-RT RIC in case of the O-RAN architecture.

According to the invention, to support enhanced joint balancing or coordination schemes between CUs and DUs for gNBs in general, the F1 interface as well as the Xn interface need to carry additional statistical information about RAN related parameters, such as for example the standard deviation and variance of the UEs throughput or latencies. Further additional RAN related parameters are listed below.

According to the invention an extension of the interfaces between gNB-DU, gNB-CU as well as 5GC is used to support the data analytics process, preferably AI, ML, and automation methods. The utilization of status reporting regarding the radio resource utilization of individual entities within the gNB-DU, e.g. PHY, MAC, etc., yields significant performance gains if combined with corresponding parameter adaptation algorithms within the gNB-CU.

For both LTE and NR cells in NG-RAN, 3GPP has already initially specified parameters to be exchanged between eNBs and gNBs over the Xn interface and between gNB-CU and gNB-DUs over the F1 interface for supporting resource coordination methods, such as coordinated scheduling and interference coordination. This also includes bitmaps for exchanging resource block allocation patterns; see TSs 38.423 and 38.473.

According to the invention a data extraction entity (DEE) and a data analytics entity (DAE) are the entities involved in the data extraction and data analytics activities within a data analytics process (DAP). Within this process, the data exchange between DEE and DAE is denoted data analytics reporting, DAR.

Figure 3:
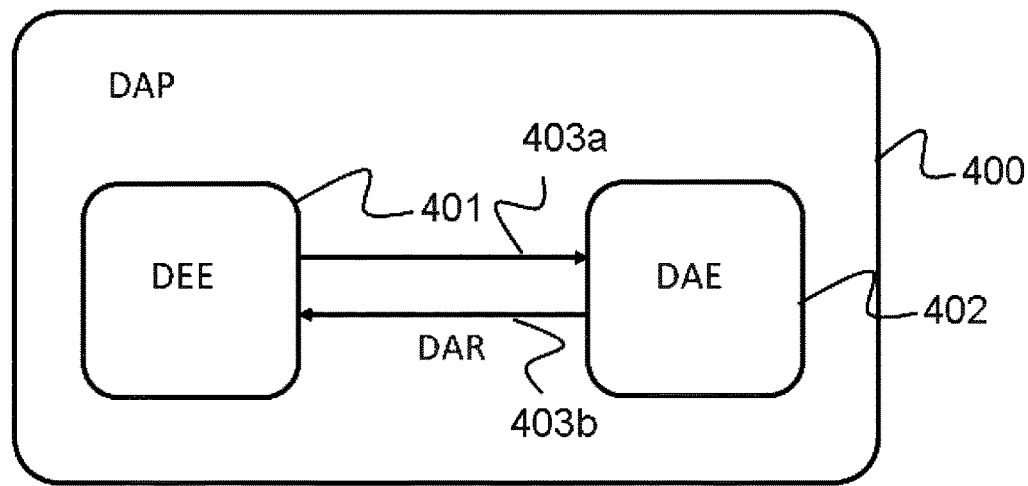
FIG. 3 shows a block diagram of a system according to an embodiment of the invention with single data extraction entity.

FIG. 3 shows a block diagram of a system according to the invention. The data analytics process 400 according to an embodiment of the invention comprises a single data extraction entity 401 communicating with a DAE 402 via a DAR

403. Said DAR comprises a transmission 403a from the DEE 401 to the DAE 402 and a transmission 403b from the DAE 402 to the DEE 401.

Figure 4:
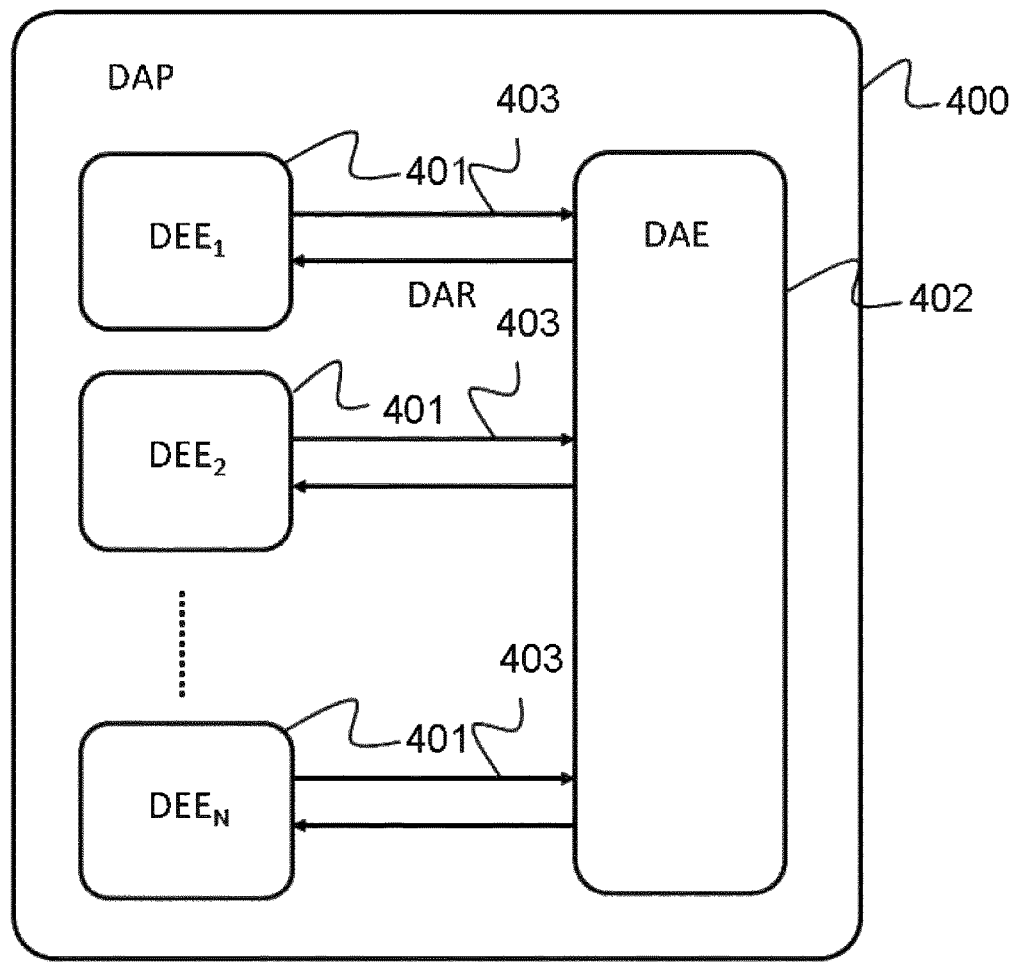
FIG. 4 shows a block diagram of a system according to an embodiment of the invention with multiple data extraction entities.

FIG. 4 shows a block diagram of a system according to the invention. The data analytics process 400 according to an embodiment of the invention comprises multiple DEEs 401 communicating with a single DAE 402 via respective DARs 403. Said DARs each comprise a respective transmission 403a from the DEE 401 to the DAE 402 and a transmission 403b from the DAE 402 to the DEE 401.

In one embodiment, in terms of data collection and analysis in the NG-RAN, the DEEs could for example correspond to the gNB-DUs or a function therein while the DAE corresponds to a gNB-CU or a function therein.

In a further embodiment, in the O-RAN concept, the near-RT RIC acts as DAE collecting data from several gNB-CUs and gNB-DUs.

In embodiments of the invention, the application of ML strategies for RAN operation and optimization relies heavily on the knowledge of the statistical properties of multiple KPIs and configuration parameters. The estimation of distributions and correlations is essential for leveraging said applications. On the other hand, the knowledge of more long term averages of specific KPIs or other parameters is generally not sufficient for said purposes.

One particular embodiment relates to latency evaluations. It is typically not sufficient to obtain an estimate for the average of the specific latency distributions. It is substantially more relevant to maintain defined probabilities for threshold transgressions. Therefore, accurate distribution or tail distribution estimations are required. The use of more than one of the empirical statistical moments provided by the DEE allows the DAE to better estimate the impact of a KPI to a final decision for one of the use cases as detailed below.

It is beneficial to provide the data analytics functions and associated ML strategies with the empirical distribution function of specific parameters. This could be established by transferring either all samples of the considered parameter or a quantized version of the empirical distribution in terms of bins of a histogram.

The first approach keeps the implementation on the DEE side quite simple since no computations are required. However, it yields a significant network traffic load if all samples have to be transferred to the DAE.

Assuming for example a sample rate of one sample per millisecond, corresponding to a subframe duration as specified for LTE and NR, would require 1000 values per second only for one KPI. A DAP for a specific RAN KPI should be configured semi-statically, preferably, with one or more of the following parameters: Time window; Filter pattern in time domain; and Filter pattern in frequency domain.

The time window determines a consecutive set of NW time intervals at the considered air interface, each e.g. corresponding to a sub-frame in LTE or NR. The filter patterns in time and frequency domain limit the KPI monitoring to specific subsets of time intervals and frequency domain resources, respectively. The latter can be configured in terms of physical resource blocks (PRBs) and bandwidth parts (BWPs) as specified in 3GPP TS 38.211.

According to the invention, the reporting from the DEE to the DAE includes a set of empirical statistical moments determined on the DEE side according to Equation 1 with $N_S$ the number of samples considered.

$$m_i = \frac{1}{N_S} \sum_{n=1}^{N_S} s_n^i \qquad \text{Equation 1}$$

These moments are also referred to as raw moments. According to the invention, these calculations are performed in the DEE and the results are transmitted from the DEE to the DAE.

In other words, $m_0$ equals 1; $m_i$ relates to the mean; $m_2$ relates to the variance; $m_3$ relates to the skewness; $m_4$ relates to the kurtosis; etc.

The first empirical statistical moment, i.e. raw moment, $\mu'_1$ is also known as the estimated mean $\mu$ of a random variable.

Moments of a random variable about the mean $\mu$ are called central moments. The variance is for example the second central moment. According to the invention estimates for the central moments are derived in the DAE based on the empirical statistical moments, i.e. raw moments, that have been transmitted from the DEE.

The n-th central moment $\mu_n$ is defined by $$\mu_n = E[(X - E[X])^n]$$

where $E[\bullet]$ is the expectation of a random variable.

The estimation of the n-th central moment $\mu_n$ can be derived in the DAE from the empirical statistical moments, i.e. raw moments $\mu'_k$ that have been transmitted from the DEE by $$\mu_n = \sum_{j=0}^{n} \binom{n}{j} (-1)^{n-j} \mu'_j \mu_1'^{m-j}$$

Specific examples are the estimation of the mean $\mu$ and the variance $\sigma^2$ of a random variable in the DAE based on the empirical statistical moments, i.e. raw moments, that have been transmitted by the DEE:

$$\mu = \mu'_1$$

$$\sigma_2 = \mu'_2 - \mu'^2_1$$

In preferred embodiments, two, three or more statistical moments are transferred. More preferably, $m_1$ and $m_2$ are transferred. More preferably, $m_1$, $m_2$, and $m_3$ are transferred.

In a preferred embodiment, in addition to the moments, the number of samples that contributed to the moment estimation is reported as well. The latter facilitates further consideration of confidence intervals for statistical parameter estimations in the DAE.

The reporting of moments instead of all samples or sample frequencies for specified bins in terms of histograms significantly reduces the signalling overhead between DEE and DAE without sacrificing accuracy of the relevant statistical information required. This is of particular relevance for ML applications as mentioned above.

According to the invention in the DAE a statistical model is used to derive an estimation of the probability distribution of the respective KPI. The statistical model uses preferably the number of samples and/or the number of statistical moments as input to determine the estimation. Based on the estimation known DAP are employed.

In a first preferred embodiment, $m_1$ and $m_2$ are the statistical moments transmitted to the DAE. The statistical model assumes a Gaussian distribution and uses $m_1$ and $m_2$ to estimate the probability distribution for a KPI.

In a second preferred embodiment, $m_1$ are the statistical moment transmitted to the DAE and all KPI values are positive. The statistical model assumes an exponential distribution and uses $m_1$ to estimate the probability distribution for a KPI.

In embodiments of the invention, the estimation of the DAE is used for traffic load balancing between cells, robust handover optimization, coverage optimization, energy saving, e.g. traffic aggregation at some main cells and switch off of offloaded cells, RACH optimization. In said embodiments the DAE is further configured to perform an optimization based on one or more determined estimation preferably based on an AI and/or ML approach.

According to the invention the reported empirical moments facilitate an estimation of the underlying distributions for example by means of the maximum entropy method. It is furthermore possible to provide estimates for distribution tails based on reported moments. The latter is in many cases sufficient in comparison with estimates for the entire distribution.

FIG. 5 shows a diagram for a comparison between moment based estimation of a distribution in terms of bins and an empirical moments based estimation according to the invention. In detail, in FIG. 5 a probability density of a respective KPI vs. processing time is shown. As solid bars the bins of histogram H for the samples measured at a DEE are shown. As a solid line an exemplary estimation M of the distribution obtained in the DAE based on a statistical model is shown. It is evident that based on the estimation M a very similar value for the probability can be determined at a threshold T compared to the value of the actual histogram H. In this particular embodiment $m_1$ and $m_2$ are the statistical moments and a Gaussian distribution is used to derive the estimation M based on $m_1$ and $m_2$. This illustrates that essentially the same information regarding a threshold can be obtained when only $m_1$ and $m_2$ are transmitted compared to the transmission of the entire histogram.

The processing time distribution of a network function is estimated based on reported bins of a histogram and based on first and second empirical statistical moment $m_1$ and $m_2$. The moment based estimation is in this case sufficient for estimating the probability for exceeding a given threshold.

FIG. 6, FIG. 7, and FIG. 8 show the signalling overhead used for different reporting concepts. In the first case, as shown in FIG. 6, all samples 500, i.e. $s_1$ to $s_k$, are transmitted from the DEE to the DAE. This provides the whole samples sequence to the DAE. However, it yields a prohibitive amount of traffic over the corresponding interface.

The second approach, as shown in FIG. 7, involves the definition of bins 501, i.e. $b_1$ to $b_L$ for specified value ranges of the evaluated KPI. The reports contain the number of samples per bin or the corresponding frequencies. This concept is already intended for application by 3GPP in terms of some KPIs within the OAM performance measurement framework, see TS 28.552.

According to the invention, as depicted in FIGS. 8 and 9, empirical statistical moments 502, preferably $m_1$, $m_2$, and $m_3$, of the KPI distribution observed by the DEE are reported. An information element IE 600 comprises the ID of a KPI, KPI ID 601, the number of samples $N_S$ 503 and statistical moments 502 $m_1$, $m_2$, and $m_3$. This concept constitutes an efficient tradeoff between reporting overhead and accuracy of the required distribution estimations in the DAE.

In embodiments of the invention, the statistical moments are determined in the DEE following Equation 1 as cited above. In addition to the moments, the number of samples, $N_S$, is reported in order to facilitate confidence interval determinations on the DAE side. The reported empirical moments facilitate an estimation of the underlying distributions for example by means of the maximum entropy method.

In embodiments of the invention, within the scope of the NG, F1, and Xn interfaces as specified by the 3GPP, the data exchange between DEE and DAE is implemented on based on information elements (IEs). Therefore the existing set of IEs for the considered interfaces are expanded within the enhanced RAN centric data analytics framework.

According to the invention each IE may be configured to be transmitted with a periodic interval or based on an aperiodic request send from the DAE to the DEE. In a NG-RAN the trigger may come from the gNB-CU or via the 5GC or via OAM, which is discussed below.

In a preferred embodiment a bit string is defined which provides the information about the format of the KPI specific values.

FIG. 9 shows a possible format for the IEs 600 according to the invention considering enhanced statistical information. The IE contains a KPI ID 601, the number of samples $N_S$ 503 that contributed to the moment estimation in the DEE, and the empirical statistical moments 502.

The number of samples $N_S$ does not necessarily have to be the same as the number of time intervals of the configured measurement window. It could be smaller in case of time intervals that contain no samples, e.g. if no data is transmitted within such a time interval, or it could be larger if multiple samples are provided per time interval, e.g. in case of transport block evaluation taking care of spatial multiplexing.

In embodiments of the invention, at least one KPI is reported
i) per-slice;
ii) per-beam;
iii) per user;
iv) per QoS Class Identifier (QCI) class;
v) per gNB-DU; and/or
vi) per gNB-CU.

In embodiments of the invention, at least one of the following KPIs is monitored and associated with a corresponding KPI ID:
a) UE throughput in downlink (DL) and uplink (UL), respectively;
b) Physical resource block (PRB) usage in downlink (DL) and uplink (UL), respectively;
c) Wideband and/or subband channel quality indicator (CQI);
d) Modulation and coding scheme (MCS) usage in downlink (DL) and uplink (UL), respectively;
e) PDCP end-to-end latency in downlink (DL) and uplink (UL), respectively;
f) HARQ ACK/NACK ratio in downlink (DL) and uplink (UL), respectively;
g) Spatial precoder usage in downlink (DL) and uplink (UL), respectively;
h) Spatial rank usage in downlink (DL) and uplink (UL), respectively;
i) Transport block size (TBS) usage in downlink (DL) and uplink (UL), respectively;
j) Number of scheduled UEs per time interval, e.g. per subframe, slot, etc., in downlink (DL) and uplink (UL), respectively;
k) Computational resource utilization of specific RAN-related virtualized network functions;
l) Composite available capacity (CAC);

m) Transport Network Layer (TNL) load or available capacity, respectively;
n) Hardware (HW) load, which is similar to Computational resource utilization; and
o) Number of UEs in Radio Resource Control (RRC) connected.

Embodiments of the invention also comprise as preferred embodiments each combination of one or more of i) to vi) and one or more KPIs of a) to o) as listed above.

In embodiments of the invention, the data analytics measurement reports are triggered from different entities in the network in an aperiodic or periodic manner. For this purpose, different message sequence charts are considered to indicate the necessary trigger points as well as the required feedback from the network entities. The following figures FIG. 10 to FIG. 15 show the possibilities that either a 5GC core network (CN) function or the gNB-CU, or optionally a neighbouring gNB-CU, triggers additional statistical information collection in an aperiodic or periodic manner.

Figure 10:
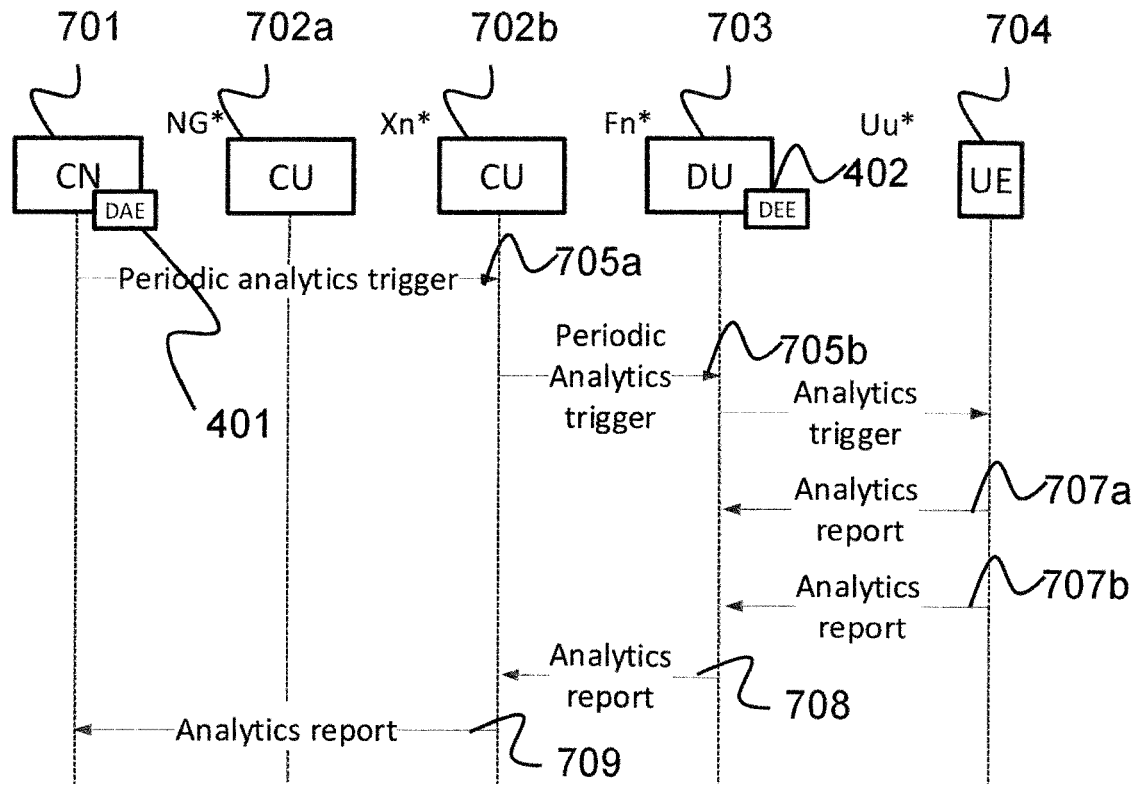
FIGS. 10 to 15 each shows a reporting architecture according to a respective embodiment of the invention.

FIG. 10 shows a reporting architecture according to an embodiment of the invention. The architecture comprises a 5GC core network (CN) 701 connected via a NG interface to a first CU 702a; the first CU 702a is connected to a second CU 702b via a Xn interface; the second CU 702b is connected to a DU 703 via a Fn interface; and the DU 703 is connected to a UE 704 via an air interface, Uu. The DAE is comprised in the CN 701 and the DEE is comprised in the DU 703. A periodic analytics trigger 705a is transmitted from the CN 701 to the second CU 702b. A further periodic analytics trigger 705b is transmitted from the second CU 702b to the DU 703. An analytics trigger 706 is transmitted from the DU 703 to the UE 704 causing the UE 704 to transmit analytics reports 707a and 707b to the DU 703. A second analytics report 708 is transmitted from the DU 703 to the second CU 702b. A third analytics report 709 is transmitted from the second CU 702b to the CN.

Figure 11:
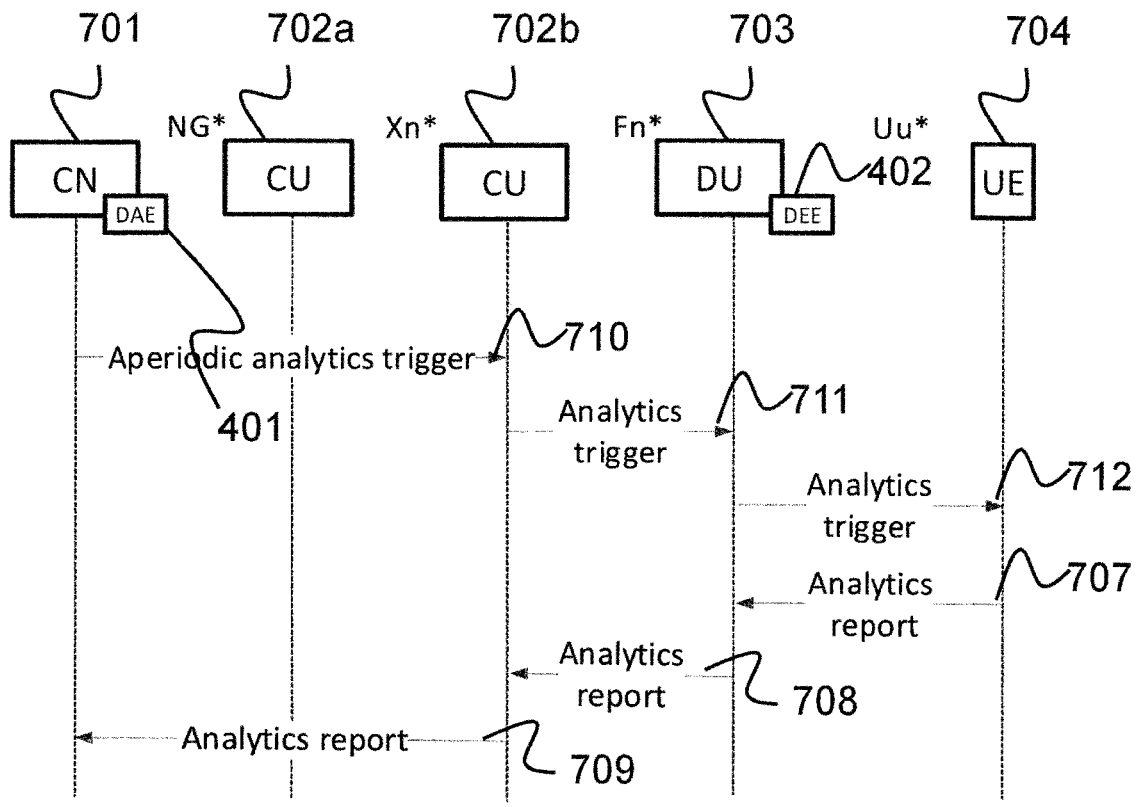

FIG. 11 shows a reporting architecture according to an embodiment of the invention. The DAE is comprised in the CN 701 and the DEE is comprised in the DU 703. An aperiodic analytics trigger 710 is transmitted from the CN 701 to the second CU 702b. An analytics trigger 711 is transmitted from the second CU 702b to the DU 703. A further analytics trigger 712 is transmitted from the DU 703 to the UE 704 causing the UE 704 to transmit an analytics report 707 to the DU 703. A second analytics report 708 is transmitted from the DU 703 to the second CU 702b. A third analytics report 709 is transmitted from the second CU 702b to the CN.

Figure 12:
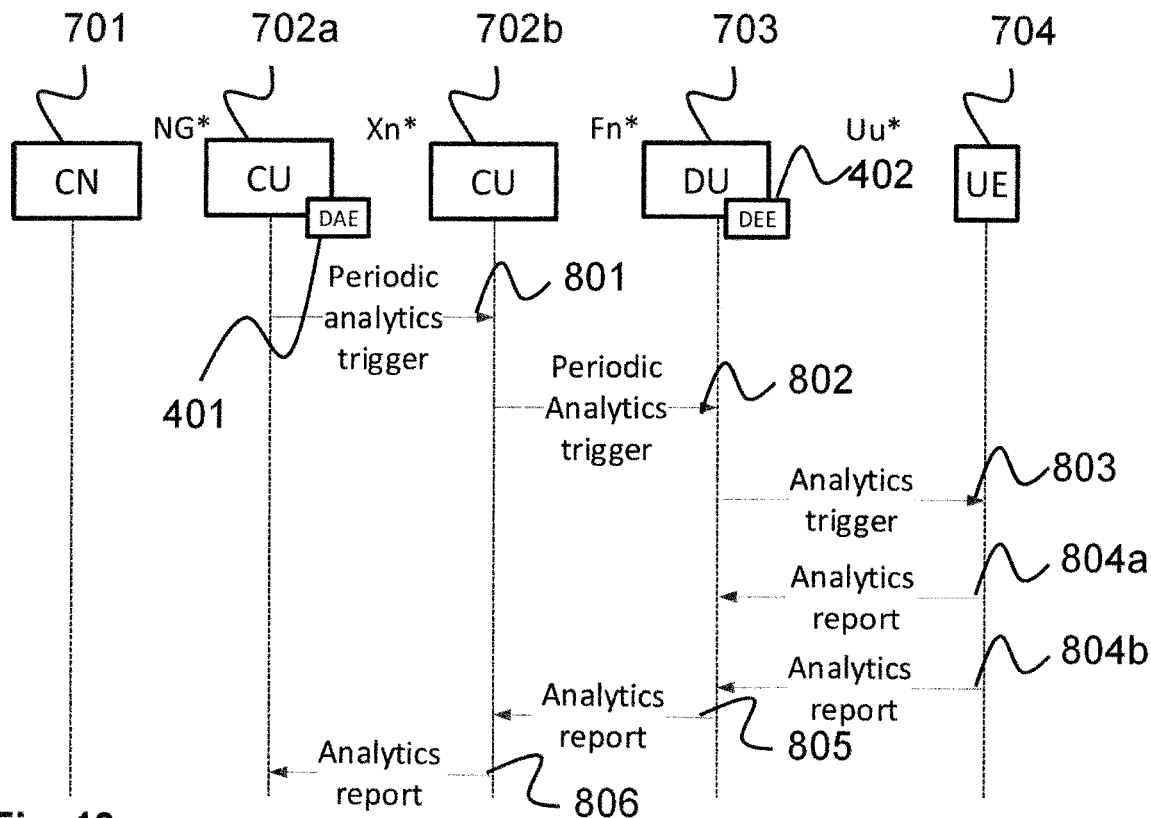

FIG. 12 shows a reporting architecture according to an embodiment of the invention. The DAE is comprised in the first CU 702a and the DEE is comprised in the DU 703. A periodic analytics trigger 801 is transmitted from the first CU 702a to the second CU 702b. A further periodic analytics trigger 802 is transmitted from the second CU 702b to the DU 703. An analytics trigger 803 is transmitted from the DU 703 to the UE 704 causing the UE 704 to transmit analytics reports 804a and 804b to the DU 703. A second analytics report 805 is transmitted from the DU 703 to the second CU 702b. A third analytics report 806 is transmitted from the second CU 702b to the first CU 702a.

Figure 13:
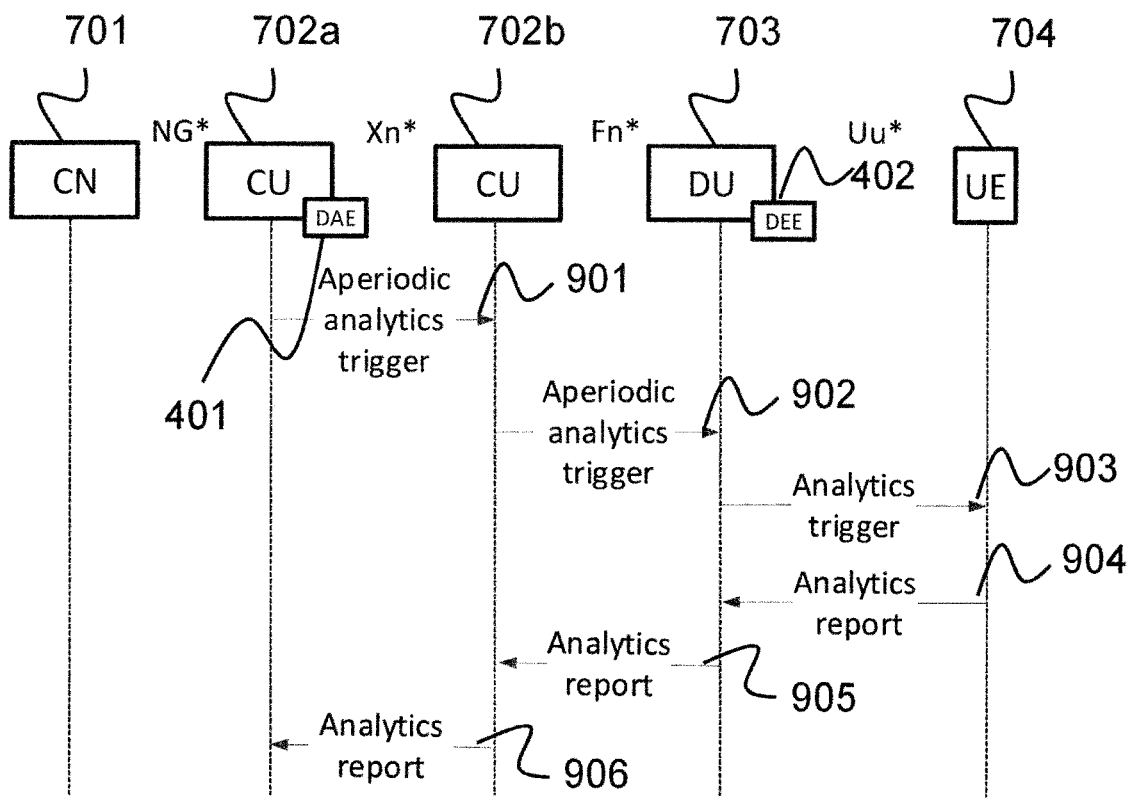

FIG. 13 shows a reporting architecture according to an embodiment of the invention. The DAE is comprised in the first CU 702a and the DEE is comprised in the DU 703. An aperiodic analytics trigger 901 is transmitted from the first CU 702a to the second CU 702b. A further aperiodic analytics trigger 902 is transmitted from the second CU 702b to the DU 703. An analytics trigger 903 is transmitted from the DU 703 to the UE 704 causing the UE 704 to transmit an analytics report 904 to the DU 703. A second analytics report 905 is transmitted from the DU 703 to the second CU 702b. A third analytics report 906 is transmitted from the second CU 702b to the first CU 702a.

Figure 14:
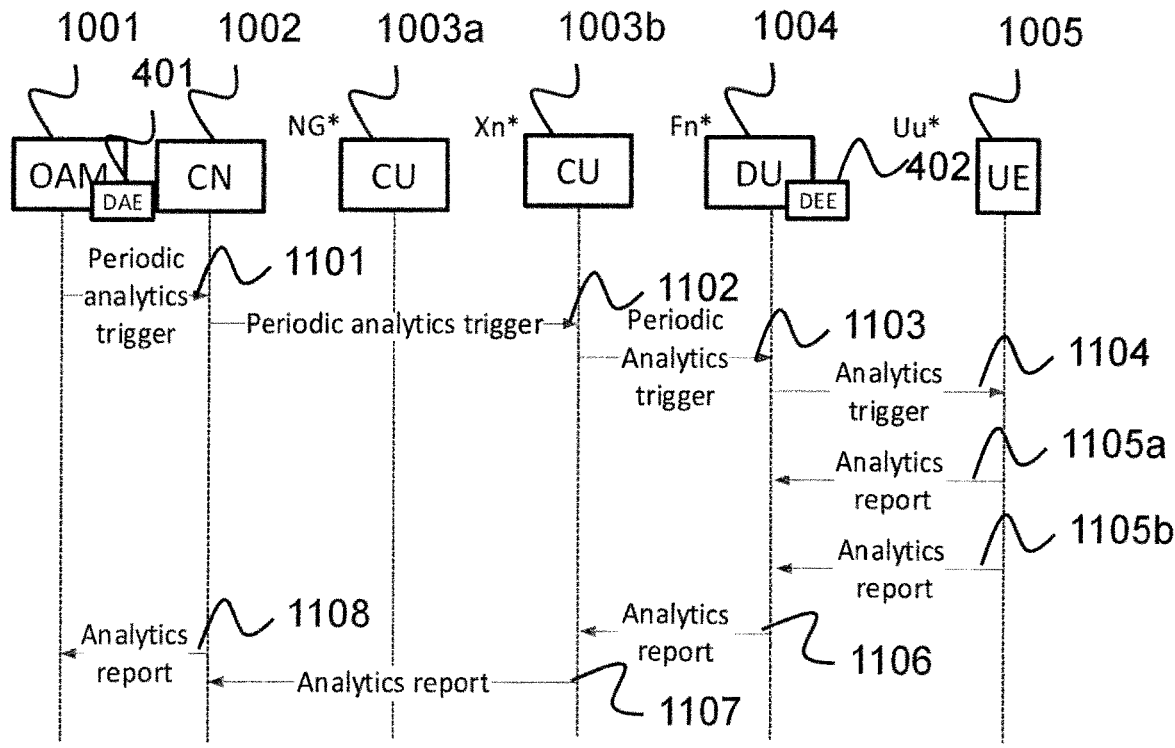

FIG. 14 shows a reporting architecture according to an embodiment of the invention. The architecture comprises an OAM 1001, a CN 1002, connected via a NG interface to a first CU 1003a; the first CU 1003a is connected to a second CU 1003b via a Xn interface; the second CU 1003b is connected to a DU 1004 via a Fn interface; and the DU 1004 is connected to a UE 1005 via an air interface, Uu. The DAE is comprised in the OAM 1001 and the DEE is comprised in the DU 1004. A periodic analytics trigger 1101 is transmitted from the OAM 1001 to the CN 1002. A further periodic analytics trigger 1102 is transmitted from the CN 1002 to the second CU 1003b. A further periodic analytics trigger 1103 is transmitted from the second CU 1003b to the DU 1004. An analytics trigger 1104 is transmitted from the DU 1004 to the UE 1005 causing the UE 1005 to transmit analytics reports 1105a and 1105b to the DU 1104. A second analytics report 1106 is transmitted from the DU 1004 to the second CU 1003b. A third analytics report 1107 is transmitted from the second CU 1003b to the CN 1002. A fourth analytics report 1108 is transmitted from the CN 1002 to the OAM 1001.

Figure 15:
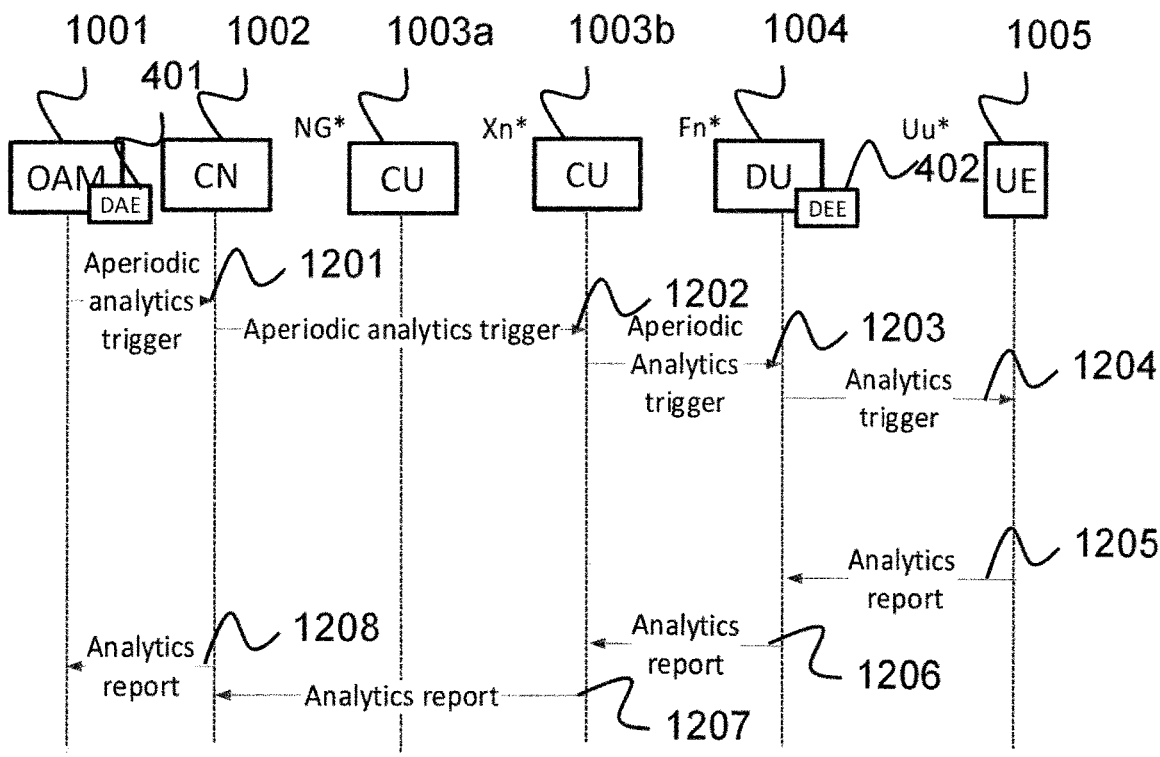

FIG. 15 shows a reporting architecture according to an embodiment of the invention. The DAE is comprised in the OAM 1001 and the DEE is comprised in the DU 1004. An aperiodic analytics trigger 1201 is transmitted from the OAM 1001 to the CN 1002. A further aperiodic analytics trigger 1202 is transmitted from the CN 1002 to the second CU 1003b. A further aperiodic analytics trigger 1203 is transmitted from the second CU 1003b to the DU 1004. An analytics trigger 1204 is transmitted from the DU 1004 to the UE 1005 causing the UE 1005 to transmit analytics report 1205 to the DU 1104. A second analytics report 1206 is transmitted from the DU 1004 to the second CU 1003b. A third analytics report 1207 is transmitted from the second CU 1003b to the CN 1002. A fourth analytics report 1208 is transmitted from the CN 1002 to the OAM 1001.

According to the invention, at least one DEE is comprised in a DU of the RAN and at least one DAE is comprised in at least one of a CU, a function of the CN, or the OAM. And the dataset transmitted from the DEE to the DAE comprises statistical moments with respect to a KPI monitored at the DEE, preferably comprises $m_1$, $m_2$, and $m_3$. It is also preferred to transmit a KPI ID and the number of samples $N_S$ measured at the DEE.

What has been described and illustrated herein are embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Abbreviations

5GC 5G Core
5GS 5G System
ACK Acknowledgement
BWP bandwidth parts, BWPs
CAC Composite available capacity
CU centralized unit
CP control plane
CQI channel quality indicator
DAE data analytics entity
DAP data analytics process
DEE data extraction entity
DL download
DU decentralized unit
HARQ Hybrid Automatic Repeat Request
HLS higher layer split
HW Hardware
IE information element
KPI RAN key performance indicators
KPI-ID RAN key performance indicators identifier
MAC Medium Access Control
MCS Modulation and coding scheme
MDT minimization of drive tests
NACK Negative Acknowledgement
gNB next generation NodeB
NG next generation
NG-RAN NG Radio Access Network
NR New Radio
OAM network operations and maintenance
PDCP end-to-end latency in downlink
PHY Physical layer
PRB Physical resource block
QoS Quality of Service
QCI Quality Class Indicator
RAN Radio Access Network
RLC Radio Link Control
RRC Radio Resource Control
RRM radio resource management,
SDAP Service Data Application Protocol
SON self-organizing networks
TNL Transport Network Layer
TBS Transport block size
UE user equipment
UL uplink
UP user plane

REFERENCES

It is acknowledged that the definitions of terms relating to the mobile telecommunication technology as presented above have been standardized. Therefore, in the above description specific terms have been used without a full definition and/or description of the corresponding feature. In those instances reference is made to corresponding features as described in at least one of the following documents which are herewith incorporated:

[1] 3GPP TS 28.552 V16.2.0 (2019 June), "Management and orchestration; 5G Performance Measurements (Release 16)"
[2] 3GPP TS 28.554 V16.1.0 (2019 June), "Management and orchestration; 5G end to end Key Performance Indicators (KPI) (Release 16)"
[3] 3GPP TS 36.314 V15.2.0 (2018 December), "Evolved Universal Terrestrial Radio Access (E-UTRA); Layer 2—Measurements (Release 15)"
[4] 3GPP TS 36.331 V15.6.0 (2019 June), "Evolved Universal Terrestrial Radio Access (E-UTRA); Radio Resource Control (RRC); Protocol Specification (Release 15)"
[5] 3GPP TR 37.816 V16.0.0 (2019 July), "Study on RAN-centric data collection and utilization for LTE and NR (Release 16)"
[6] 3GPP TS 38.211 V15.6.0 (2019 June), "NR; Physical channels and modulation (Release 15)"
[7] 3GPP TS 38.331 V15.6.0 (2019 June), "NR; Radio Resource Control (RRC) protocol specification (Release 15)"
[8] 3GPP TS 38.401 V15.6.0 (2019 July), "NG-RAN; Architecture description (Release 15)"
[9] 3GPP TS 38.423 V15.4.0 (2019 July), "NG-RAN; Xn application protocol (XnAP) (Release 15)"
[10] 3GPP TS 38.473 V15.6.0 (2019 July), "NG-RAN; F1 application protocol (F1AP) (Release 15)"

The invention claimed is:
1. A method, comprising:
data analytics reporting (DAR) of a Radio Access Network (RAN) key performance indicator (KPI) from a data extraction entity (DEE) to a data analytics entity (DAE) in a data analytics process (DAP);
wherein the DEE is comprised in a gNB-Distributed Unit (gNB-DU) or a function therein; and wherein the DAE is comprised in a gNB-Centralized Unit (gNB-CU) or a function therein;
wherein the reporting is performed via an interface;
wherein a dataset regarding said KPI is transmitted from the DEE to the DAE;
wherein said dataset comprises at least one empirical statistical moment $m_i$ determined by the DEE;
wherein each of the at least one empirical statistical moment $m_i$ is determined by the DEE based on the following equation:

$$m_i = \frac{1}{N_s} \sum_{n=1}^{N_s} s_n^i;$$

wherein $s_n$ is a data sample of the KPI and $N_S$ is a number of samples contributing to the respective moment $m_i$; and wherein:
the interface is an F1 interface; and/or
the analytics reporting between the DEE and the DAE via the interface is implemented via information elements (IEs).

2. The method according to claim 1,
wherein the samples $s_n$ are measured at the DEE; and
wherein the at least one empirical statistical moment $m_i$ is based on a histogram distribution with respect to measured KPI data.

3. The method according to claim 1, wherein the dataset further comprises the number of samples $N_S$.

4. The method according to claim 1, wherein each IE is transmitted based on a periodic interval or on an aperiodic request sent from the DAE to the DEE.

5. The method according to claim 1, wherein each IE comprises a bit string which comprises information about a format of KPI specific values.

6. The method according to claim 1, wherein a respective IE comprises at least one of the following: a KPI ID, the number of samples $N_S$, or the at least one empirical statistical moment $m_i$.

7. The method according to claim 1, wherein the KPI relates to a parameter measured in at least one of the following ways:
i) per-slice;
ii) per-beam;
iii) per user;
iv) per QoS Class Identifier (QCI) class;
v) per gNB-DU; or
vi) per gNB-CU.

8. The method according to claim 1, wherein the KPI comprises one of the following:
a) UE throughput in downlink (DL) and uplink (UL), respectively;
b) Physical resource block (PRB) usage in downlink (DL) and uplink (UL), respectively;
c) Wideband and/or subband channel quality indicator (CQI);
d) Modulation and coding scheme (MCS) usage in downlink (DL) and uplink (UL), respectively;
e) PDCP end-to-end latency in downlink (DL) and uplink (UL), respectively;
f) HARQ ACK/NACK ratio in downlink (DL) and uplink (UL), respectively;
g) Spatial precoder usage in downlink (DL) and uplink (UL), respectively;
h) Spatial rank usage in downlink (DL) and uplink (UL), respectively;
i) Transport block size (TBS) usage in downlink (DL) and uplink (UL), respectively;
j) Number of scheduled UEs per time interval, subframe, and/or slot in downlink (DL) and uplink (UL), respectively;
k) Computational resource utilization of specific RAN-related virtualized network functions;
l) Composite available capacity (CAC);
m) Transport Network Layer (TNL) load or available capacity, respectively;
n) Hardware (HW) load; or
o) Number of UEs in Radio Resource Control (RRC) Connected.

9. A data extraction entity (DEE), comprised in a gNB-Distributed Unit (gNB-DU) or a function therein, wherein the DEE comprises a processor and a memory, wherein the processor is configured to execute instructions stored on the memory to facilitate the following being performed by the DEE:
determining at least one empirical statistical moment $m_j$ of a Radio Access Network (RAN) Key performance Indicator (KPI), wherein each of the at least one empirical statistical moment is based on the following equation:

$$m_i = \frac{1}{N_S}\sum_{n=1}^{N_S} s_n^i;$$

wherein $s_n$ is a data sample of the KPI and $N_S$ is a number of samples contributing to the respective moment $m_i$; and
transmitting, via an interface, a dataset to a data analytics entity (DAE) in a data analytics process (DAP), wherein the DAE is comprised in a gNB-Centralized Unit (gNB-CU) or a function therein;
wherein the dataset comprises the at least one empirical statistical moment determined by the DEE; and
wherein:
the interface is an F1 interface; and/or
analytics reporting between the DEE and the DAE via the interface is implemented via information elements (IEs).

10. A data analytics entity (DAE), comprised in a gNB-Centralized Unit (gNB-CU) or a function therein, wherein the DAE comprises a processor and a memory, wherein the processor is configured to execute instructions stored on the memory to facilitate the following being performed by the DAE:
receiving, via an interface, a dataset from a data extraction entity (DEE) in a data analytics process (DAP), wherein the DEE is comprised in a gNB-Distributed Unit (gNB-DU) or a function therein;
wherein the dataset comprises at least one empirical statistical moment $m_j$ of a Radio Access Network (RAN) Key performance Indicator (KPI), wherein each of the at least one empirical statistical moment is determined by the DEE based on the following equation:

$$m_i = \frac{1}{N_S}\sum_{n=1}^{N_S} s_n^i;$$

wherein $s_n$ is a data sample of the KPI and $N_S$ is a number of samples contributing to the respective moment $m_i$; and
wherein:
the interface is an F1 interface; and/or
analytics reporting between the DEE and the DAE via the interface is implemented via information elements (IEs).

11. A non-transitory computer-readable medium of a data extraction entity (DEE) comprised in a gNB-Distributed Unit (gNB-DU) or a function therein, wherein the non-transitory computer-readable medium has processor-executable instructions stored thereon, and wherein the processor-executable instructions, when executed, facilitate performance of the following by the DEE:
determining at least one empirical statistical moment $m_j$ of a Radio Access Network (RAN) Key performance Indicator (KPI), wherein each of the at least one empirical statistical moment is based on the following equation:

$$m_i = \frac{1}{N_s}\sum_{n=1}^{N_s} s_n^i,$$

wherein $s_n$ is a data sample of the KPI and $N_S$ is a number of samples contributing to the respective moment $m_i$; and transmitting, via an interface, a dataset to a data analytics entity (DAE) in a data analytics process (DAP), wherein the DAE is comprised in a gNB-Centralized Unit (gNB-CU) or a function therein;

wherein the dataset comprises the at least one empirical statistical moment determined by the DEE; and wherein:
the interface is an F1 interface; and/or
analytics reporting between the DEE and the DAE via the interface is implemented via information elements (IEs).

12. A non-transitory computer-readable medium of a data analytics entity (DAE) comprised in a gNB-Centralized Unit (gNB-CU) or a function therein, wherein the non-transitory computer-readable medium has processor-executable instructions stored thereon, and wherein the processor-executable instructions, when executed, facilitate performance of the following by the DAE:

receiving, via an interlace, a dataset from a data extraction entity (DEE) in a data analytics process (DAP), wherein the DEE is comprised in a gNB-Distributed Unit (gNB-DU) or a function therein;

wherein the dataset comprises at least one empirical statistical moment $m_i$ of a Radio Access Network (RAN) Key performance Indicator (KPI), wherein each of the at least one empirical statistical moment is determined by the DEE based on the following equation:

$$m_i = \frac{1}{N_s}\sum_{n=1}^{N_s} s_n^i,$$

wherein $s_n$ is a data sample of the KPI and $N_S$ is a number of samples contributing to the respective moment $m_i$; and wherein:
the interface is an F1 interlace; and/or
analytics reporting between the DEE and the DAE via the interface is implemented via information elements (IEs).

* * * * *